Patented Nov. 15, 1927.

1,649,671

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

HEXYL RESORCINOL COMPOSITION.

No Drawing. Application filed November 5, 1926. Serial No. 146,567.

This invention relates to a new antiseptic composition intended for internal administration. The new composition comprises hexyl resorcinol dissolved in an oil such as olive oil.

Hexyl resorcinol has a remarkably high antiseptic value, having a phenol coefficient of about 50. By dissolving it in an oil such as olive oil it is readily administered with a minimum of irritation in the stomach and is better absorbed in the system, while its action in the intestines is also apparently improved.

Hexyl resorcinol in a pure state is a crystalline solid melting above 68° C. It need not be isolated in a state of the highest purity for a small amount of the intermediate product of its production, namely, hexylyl resorcinol, e. g., in amount not more than 5%, may be present without interfering objectionably with the action of the product. Hexyl resorcinol may be produced without crystallization in a sufficiently pure state and directly dissolved in the oil.

The oil used in the new composition is an edible oil or one which can be administered internally without interfering with metabolism. Preferably it is an edible or bland oil such as an animal or vegetable oil, of which olive oil is an example.

The amount of hexyl resorcinol combined with the olive oil or other oil may be varied. A dilute solution containing e. g. 2–2½% hexyl resorcinol in the olive oil may be used. A much higher content of the hexyl resorcinol may, however, be used, for example, a 25% solution of hexyl resorcinol in olive oil. Such a concentrated solution can advantageously be made into capsule form. The coating of the capsule may be an enteric coating which will prevent or retard absorption in the stomach and largely cause the capsule to pass through the stomach to the intestines practically unchanged.

The capsule, however, may be a gelatine capsule but in such case the gelatine should not be a soft gelatine containing a considerable amount of glycerine, but should be a relatively hard gelatine which will resist the penetrating action of the hexyl resorcinol.

In making gelatine capsules the olive oil solution of hexyl resorcinol may be spread upon a gelatine sheet and the sheet then covered by another sheet and the sheets then pressed in a capsule machine to form the gelatine coating of the capsules and cause the edges of the gelatine to adhere together when brought into contact by the capsule machine. In this way a definite amount of the composition can be enclosed in each capsule, for example, 0.15 grams of hexyl resorcinol per capsule in the form of a 25% solution in olive oil.

The dose of hexyl resorcinol for an adult may be from 0.15 to 0.6 grams three times a day after meals, or, if taken between meals, preferably with a large glass of rich milk.

The administration of the hexyl resorcinol in the form of such capsules and in olive oil solution has proven to be an effective and advantageous method of administration, particularly for use as a urinary antiseptic.

This application is a continuation in part of my prior application Ser. No. 654,928, filed July 31, 1923, which describes the production of hexyl resorcinol.

I claim:

1. An antiseptic composition for internal administration comprising a solution of hexyl resorcinol in oil.

2. An antiseptic composition for internal administration comprising a solution of hexyl resorcinol in olive oil.

3. An antiseptic composition for internal administration comprising a solution of hexyl resorcinol in olive oil containing about 25% hexyl resorcinol.

4. An antiseptic composition comprising a capsule of gelatine resistant of hexyl resorcinol containing an olive oil solution of hexyl resorcinol.

5. An antiseptic composition for internal administration comprising a solution of hexyl resorcinol in olive oil containing about 2½% hexyl resorcinol.

In testimony whereof I affix my signature.

ALFRED R. L. DOHME.